(12) United States Patent
Ogawa

(10) Patent No.: US 9,783,057 B2
(45) Date of Patent: Oct. 10, 2017

(54) VEHICLE DISPLAY DEVICE

(71) Applicant: NIPPON SEIKI CO., LTD., Niigata (JP)

(72) Inventor: Norihiro Ogawa, Niigata (JP)

(73) Assignee: NIPPON SEIKI CO., LTD., Nigata (JP)

( * ) Notice: Subject to any disclaimer, the term of this patent is extended or adjusted under 35 U.S.C. 154(b) by 0 days.

(21) Appl. No.: 15/121,152

(22) PCT Filed: Feb. 13, 2015

(86) PCT No.: PCT/JP2015/053936
§ 371 (c)(1),
(2) Date: Aug. 24, 2016

(87) PCT Pub. No.: WO2015/129482
PCT Pub. Date: Sep. 3, 2015

(65) Prior Publication Data
US 2016/0368381 A1    Dec. 22, 2016

(30) Foreign Application Priority Data
Feb. 26, 2014    (JP) .................................. 2014-035989

(51) Int. Cl.
*G09F 9/00*      (2006.01)
*B60Q 1/00*      (2006.01)
(Continued)

(52) U.S. Cl.
CPC .............. *B60K 37/02* (2013.01); *B60K 35/00* (2013.01); *G01D 11/26* (2013.01);
(Continued)

(58) Field of Classification Search
CPC .............. B60K 37/02; B60K 2350/402; B60K 2350/1076; B60K 2350/2086; B60K 2350/203; B60K 35/00
(Continued)

(56) References Cited

U.S. PATENT DOCUMENTS

2004/0189483 A1*  9/2004  Stringfellow .......... B60K 37/02
                                                340/815.4
2006/0202993 A1*  9/2006  Birman .................. G02B 6/005
                                                  345/426
(Continued)

FOREIGN PATENT DOCUMENTS

JP      63-137043 A     6/1988
JP      2003-080974 A   3/2003
(Continued)

OTHER PUBLICATIONS

Search Report issued in corresponding International Application No. PCT/JP2015/053936, dated May 12, 2015.

*Primary Examiner* — Hoi Lau
(74) *Attorney, Agent, or Firm* — McDermott Will Emery LLP

(57) ABSTRACT

Provided is a vehicle display device which exhibits high visibility, and which has an attractive external appearance. A vehicle display device according to the present invention is provided with: pointer-type instruments (a speedometer and an engine tachometer; a display disposed next to the pointer-type instruments; and a planar protective plate which has, formed on the front surface thereof, a first reflected-light suppression layer. The protective plate is disposed so as to cover the front surfaces of the display and the pointer-type instruments. Furthermore, in the protective plate, light-blocking layers for concealing spaces between the display and the pointer-type instruments are formed. Moreover, a light-transmitting bonding layer, which covers and bonds a (Continued)

display surface of the display, and second reflected-light suppression layers, which cover the front surfaces of the pointer-type instruments, are formed on the rear surface of the protective plate so as to not overlie each other.

4 Claims, 3 Drawing Sheets

(51) Int. Cl.
*B60K 37/02* (2006.01)
*B60K 35/00* (2006.01)
*G01D 11/26* (2006.01)

(52) U.S. Cl.
CPC .............. *B60K 2350/1076* (2013.01); *B60K 2350/2086* (2013.01); *B60K 2350/402* (2013.01)

(58) Field of Classification Search
USPC ...... 340/461, 438, 425.5, 815.4; 345/660, 7, 345/633, 102, 426
See application file for complete search history.

(56) References Cited

U.S. PATENT DOCUMENTS

| | | | | |
|---|---|---|---|---|
| 2008/0174416 | A1* | 7/2008 | Pala | G01D 11/28 340/461 |
| 2009/0015395 | A1* | 1/2009 | Rahe | B60K 35/00 340/461 |
| 2012/0126966 | A1* | 5/2012 | Drury | B60K 35/00 340/438 |
| 2015/0306958 | A1* | 10/2015 | Birman | B60K 37/02 340/438 |
| 2015/0379773 | A1* | 12/2015 | Konishi | B60Q 3/044 345/633 |
| 2016/0025973 | A1* | 1/2016 | Guttag | G02B 27/0101 345/7 |
| 2016/0189345 | A1* | 6/2016 | Fujita | G09G 5/12 345/660 |
| 2016/0207453 | A1* | 7/2016 | McDade | B60Q 3/044 |
| 2016/0209250 | A1* | 7/2016 | Hopersberger | G01D 11/28 |
| 2017/0072800 | A1* | 3/2017 | Fujita | B60K 35/00 |

FOREIGN PATENT DOCUMENTS

| | | |
|---|---|---|
| JP | 2006-098149 A | 4/2006 |
| JP | 2011-022523 A | 2/2011 |
| JP | 2015-031592 A | 2/2015 |
| WO | 2014/168067 A1 | 10/2014 |

* cited by examiner

VEHICLE DISPLAY DEVICE

CROSS REFERENCE

This application is the U.S. National Phase under 35 US.C. §371 of International Application No. PCT/JP2015/053936, filed on Feb. 13, 2015, which claims the benefit of Japanese Application No. 2014-035989, filed on Feb. 26, 2014, the entire contents of each are hereby incorporated by reference.

TECHNICAL FIELD

The invention relates to a vehicle display device that exhibits high visibility and has an attractive external appearance.

BACKGROUND ART

In a vehicle display device for indicating vehicle information such as the travel speed of a vehicle using a pointer-type instrument disposed in the vicinity of the front glass of the driver's seat of the vehicle, external light (sunlight) having entered the vehicle is reflected by the display surface of the vehicle display device, thereby impairing the visibility. Accordingly, there are various types of conventional vehicle display devices that eliminate excess light by providing a visor or prevent light reflected by the lens surface from entering the driver's eyes by curving the protective plate for protecting the display surface.

However, since the visor or the curved protective plate reduces the driver's forward openness, PTL 1 and PTL 2 have proposed, as vehicle display devices that eliminate such a problem, vehicle display devices having a planar protective plate for protecting the display surface of a vehicle display device and reflected-light suppression layers for suppressing reflected light on the front surface and back surface of the protective plate thereof.

In recent years, there are various types of vehicle display devices that indicate vehicle information such as the travel speed of a vehicle on a display such as a liquid crystal display using images and PTL 3 has proposed a vehicle display device in which the portion between a protective plate for protecting the display surface of a display and the display is filled with light-transparency resin to form a bonding layer for bonding the display to the protective plate.

CITATION LIST

Patent Literature

PTL 1: JP-A-63-137043
PTL 2: JP-A-2003-80974
PTL 3: JP-A-2011-22523

SUMMARY OF INVENTION

Technical Problem

However, when a pointer-type instrument having three-dimensional effects as disclosed in PTL 1 and PTL 2 is combined with a display enabling extensive display representation as disclosed in PTL 3 to configure a vehicle display device having an attractive external appearance in which both instruments are integrated with each other on a single protective plate, if a reflected-light suppression layer for suppressing light reflected to the driver using external light illuminating the pointer-type instrument is also formed on the rear surface of the protective layer, during formation of a bonding layer for bonding the display to the protective layer on the reflected-light suppression layer formed on the rear surface, air bubbles maybe included between the reflected-light suppression layer and the bonding layer, adhesiveness may be lost, and the display may fall off the protective plate.

In addition, when the pointer-type instrument and the display are integrated with each other using a single protective plate so that a plurality of display instruments are arranged adjacently to each other on the protective plate, since light emitted from these instruments interferes with each other on the rear surface of the protective plate or, for example, important information (such as the travel speed of the vehicle) for driving the vehicle indicated by the pointer-type instrument is buried in various types of information indicated by the display because a plurality of display instruments are present on a single plane, possibly impairing visibility.

The invention addresses the above problem with an object of providing a vehicle display device that exhibits high visibility and has an attractive external appearance.

Solution to Problem

A vehicle display device according to the invention includes
  a pointer-type instrument,
  a display provided adjacently to the pointer-type instrument, and
  a planar protective plate having a front surface on which a first reflected-light suppression layer is formed, the protective plate being provided so as to cover front surfaces of the pointer-type instrument and the display,
  in which the protective plate includes a light blocking layer for concealing a space between the pointer-type instrument and the display and
  the protective plate includes, on a back surface, a light-transparency bonding layer covering and boding a display surface of the display and a second reflected-light suppression layer covering the front surface of the pointer-type instrument so that the light-transparency bonding layer and the second reflected-light suppression layer are not laminated with each other.

In addition, preferably, the vehicle display device according to the invention further includes
  an alert instrument provided adjacently to the pointer-type instrument and the display, the alert instrument having a front surface covered with the protective plate,
  in which the light blocking layer conceals a space between the pointer-type instrument and the alert instrument and a space between the display and the alert instrument.

In addition, preferably, in the vehicle display device according to the invention,
  a light blocking wall is disposed in a part on the back surface of the protective plate, the part being positioned between the pointer-type instrument and the display, the light blocking wall preventing emitted light from the pointer-type instrument and emitted light from the display from being mixed with each other on a rear surface of the protective plate.

In addition, preferably, in the vehicle display device according to the invention,
  the pointer-type instrument indicates a travel speed of a vehicle and contrast between the light blocking layer and the pointer-type instrument is higher than contrast between the light blocking layer and instruments other than the pointer-type instrument.

Advantageous Effects of Invention

According to the invention, a vehicle display device that exhibits high visibility and has an attractive external appearance can be provided.

DESCRIPTION OF EMBODIMENTS

Figure 1:
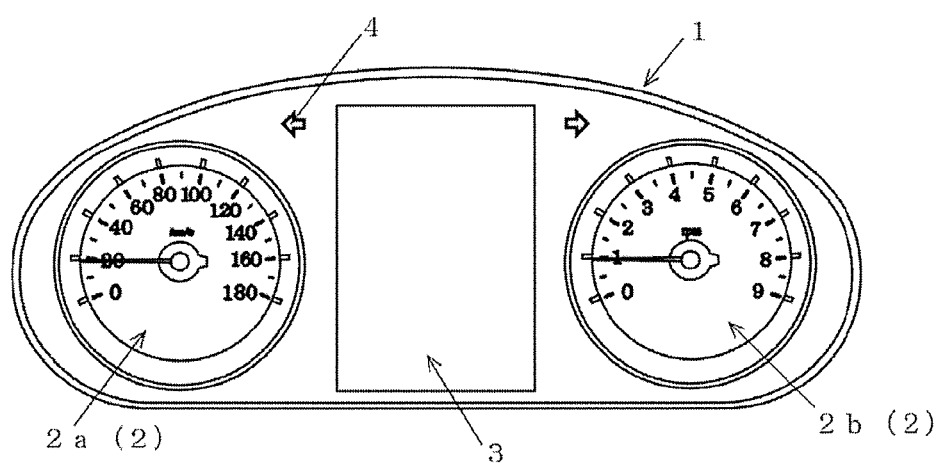
FIG. 1 is a front view illustrating a vehicle display device according to an embodiment of the invention.
Figure 2:
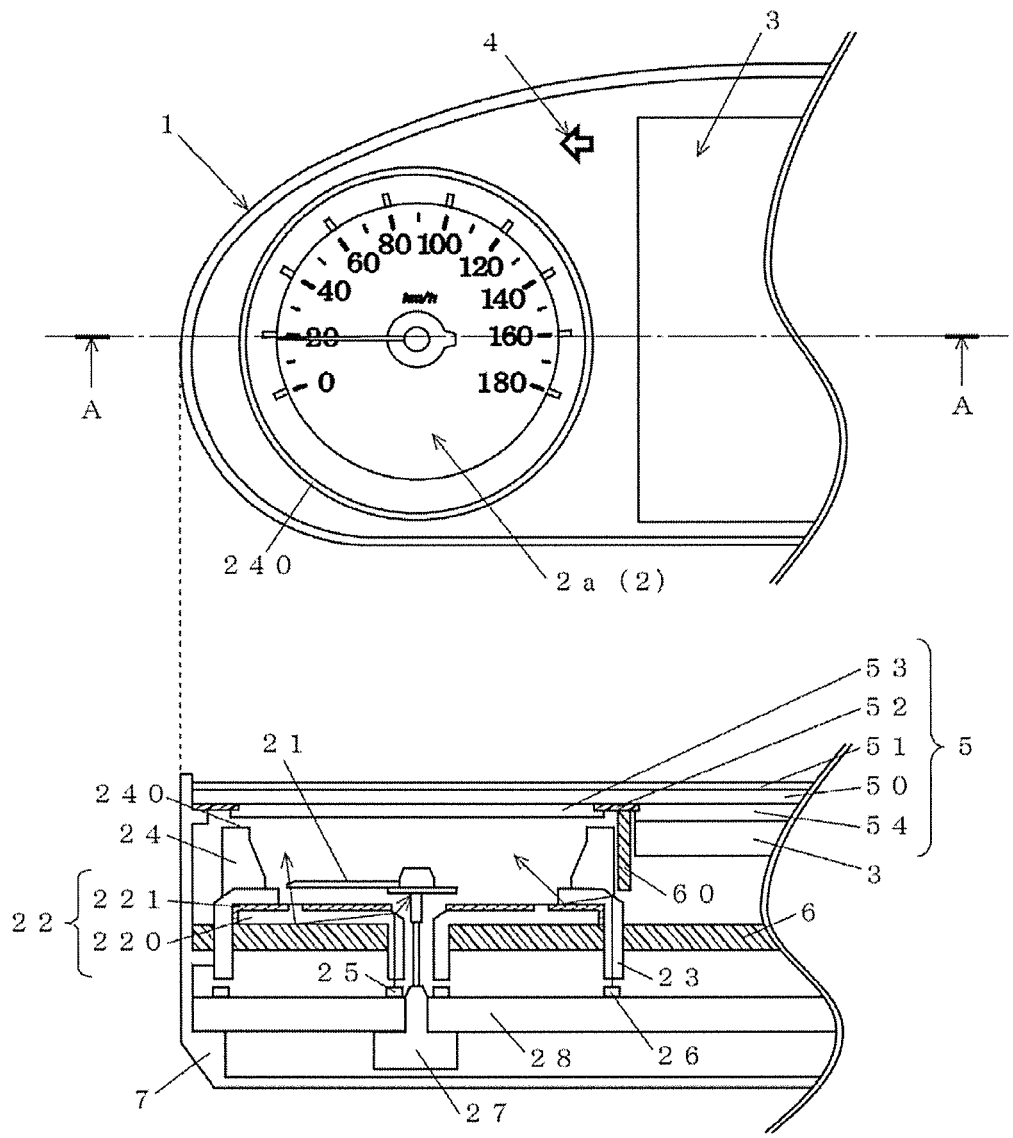
FIG. 2 is a cross sectional view illustrating the vehicle display device according to the embodiment taken along line A-A.
Figure 3:
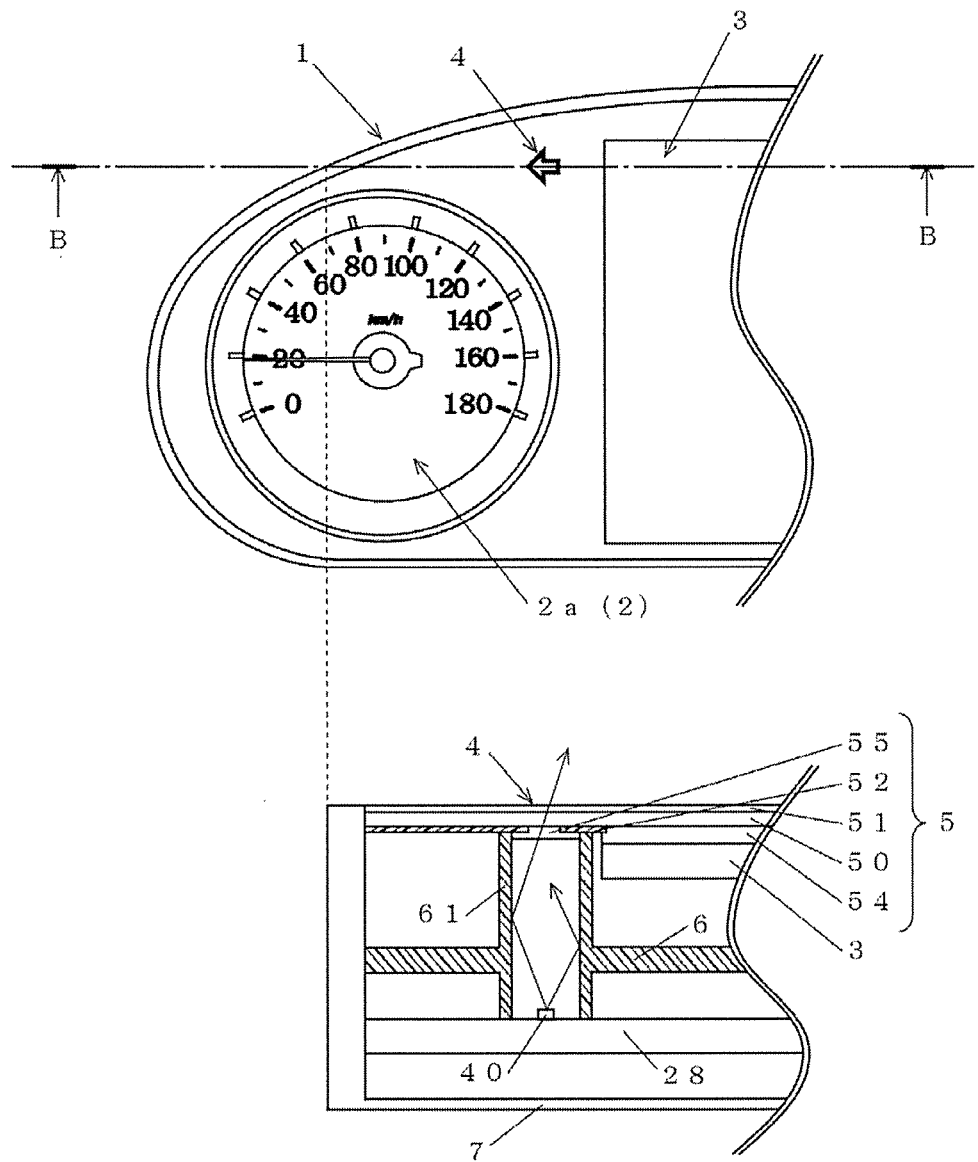
FIG. 3 is a cross sectional view illustrating the vehicle display device according to the embodiment taken along line B-B.

An embodiment of the invention will be described below with reference to the drawings.

A vehicle display device 1 according to the invention includes a pointer-type instrument 2, a display 3, an alert instrument 4, a protective plate 5, an inner case 6, and an outer case 7.

The pointer-type instrument 2 includes a pointer 21, a dial plate 22 having an indication part on its a surface, a light guiding body 23, a decorative member 24, light sources 25 and 26, a motor 27, and a circuit board 28 and indicates the measurement values of a vehicle by indicating a position corresponding to the measurement values of the vehicle on the indication part of the dial plate 22 using the pointer 21.

The vehicle display device 1 includes a speedometer 2a and an engine tachometer 2b as the pointer-type instruments 2. The speedometer 2a indicates the travel speed of a vehicle and the engine tachometer 2b indicates the engine revolutions of the vehicle.

In the dial plate 22, a black printed layer 221 is formed in a position other than that corresponding to an indication part including numbers, shapes, and the like on a light guiding body 220 made of synthetic resin having transparent or translucent light-transparency (including light-translucency). In addition, the light guiding body 220 guides light emitted from the white light source 25 including a LED or the like mounted on the circuit board 28 from a part in which the printed layer 221 is not formed to the upper surface of the dial plate 22 to illuminate the indication part. In addition, the light guiding body 220 also guides light emitted from the light source 25 to the pointer 21 to illuminate the pointer 21.

The light guiding body 23 guides light emitted from the blue light source 26 including an LED or the like so as to illuminate the dial plate 22 from the side.

The decorative member 24 is made of synthetic resin, surrounds the pointer-type instrument 2, and projects from the dial plate 22 to the protective plate 5 to provide the pointer-type instrument 2 with three-dimensional effects. In addition, the decorative member 24 is provided with a ring frame part 240 having a metallic mirror luster obtained by coating the surface with chrome plating in the part of the outer periphery closest to the protective plate 5.

The motor 27 includes, for example, a stepping motor and the pointer 21 is attached to its rotational shaft. In addition, the motor 27 rotates by a specified angle clockwise or counterclockwise according to control from control means mounted on the circuit board 28 described later.

On the front and rear of the circuit board 28, the light source 25, the light source 26, the motor 27, a light source 40 described later, and a CPU and various types of electronic parts controlling these components are mounted.

The display 3 includes, for example, a thin-film transistor type color liquid crystal module and indicates vehicle information such as the remaining amount of fuel, fuel economy information, and guide information using images. In addition, the display 3 may be of multi-dot or segment type or an EL (Electro Luminescence) module.

The alert instrument 4 reports a predetermined alert by illuminating or blinking the alert design formed in the protective plate 5 using light emitted by the light source 40 on the circuit board 28 provided on the rear surface of the protective plate 5. In addition, the alert design is configured by a combination of shapes and characters for indication of an alert or caution, such as indication of, for example, the blinking of directional signals of a vehicle or indication of a function failure of an engine or air bag of a vehicle. In addition, the light source 40 is configured by one of red, orange, and yellow light sources depending on the corresponding alert design.

The protective plate 5 includes a first reflected-light suppression layer 51, a light blocking layer 52, a second reflected-light suppression layer 53, a bonding layer 54, and a semitransparent layer 55 on a base material 50. In addition, the protective plate 5 covers and protects the display surfaces of the speedometer 2a, the engine tachometer 2b, the display 3, and the alert instrument 4.

The inner case 6 is made of opaque synthetic resin and supports the circuit board 28. In addition, the inner case 6 is provided with light blocking walls 60 for blocking light between the speedometer 2a and the display 3 and between the engine tachometer 2b and the display 3. In addition, the inner case 6 is provided with a light guiding wall 61 for guiding light emitted by the light source 40 mounted on the circuit board 28 to the alert design formed in the protective plate 5.

The outer case 7 is made of opaque synthetic resin and accommodates instruments (the speedometer 2a, the engine tachometer 2b, the display 3, and a waning meter 4) and the inner case 6 and supports the protective plate 5.

The base material 50 is made of inorganic glass. Functional layers formed on the base material 50 will be described below assuming that the surface close to the driver is the front surface and the opposite surface is the rear surface.

The first reflected-light suppression layer 51 is configured by a thin film reducing reflected light using properties such as, for example, polarization, AR (Anti Reflect), AG (Anti Glare), and translucency and the first reflected-light suppression layer 51 is formed on the front surface of the base material 50 using vapor deposition, sputtering, or another method. The first reflected-light suppression layer 51 may be formed by attaching a thin film separately formed to the front surface of the base material 50 through pressing or bonding agent.

The light blocking layer 52 is configured by, for example, a black printed layer and forms an alert design (so as to surround the alert design) in the position corresponding to the alert instrument 4. In addition, the light blocking layer 52 covers the space between the speedometer 2a, the display 3, and the alert design of the alert instrument 4 and the space between the engine tachometer 2b, the display 3, and the alert design of the alert instrument 4 so that the spaces cannot be seen via the protective plate 5. Alternatively, the light blocking layer 52 may be formed on the surface of the base material 50.

The second reflected-light suppression layer 53 is configured by a functional thin film reducing reflected light using properties such as, for example, polarization, AR (Anti Reflect), AG (Anti Glare), and translucency and the second reflected-light suppression layer 53 is formed on the rear surface of the base material 50 using vapor deposition, sputtering, or another method so as to cover the position corresponding to the display area of the pointer-type instrument 2.

The bonding layer 54 is formed by irradiating, for example, silicone, urethane, or acrylic transparent and colorless liquid photo-curable resin (for bonding the protective plate 5 to the front surface of the display 3 using optical bonding) with an ultraviolet ray to cure the resin. The bonding layer 54 and the second reflected-light suppression layer are formed so as not to be laminated with each other. The bonding layer 54 is not limited to a photo-curable type and may be a heat-curable type.

The anti-dazzle layer 55 is made of a translucent black resin and formed on the rear surface of the base material 50 so as to cover the position of the alert design formed in the protective plate 5. In addition, the transparency of the anti-dazzle layer 55 is preferably set so that the driver is not dazzled when the light source 40 of the alert instrument 4 illuminates and the driver cannot see the inside of the alert instrument 4 when the light source 40 of the alert instrument 4 does not illuminate.

As described in the above embodiment, in the vehicle display device 1 according to the invention, the light blocking layer 52 concealing a space between the pointer-type instrument 2 and the display 3 is formed on the protective plate 5 and the light-transparent bonding layer 54 covering and bonding the display surface of the display 3 and the second reflected-light suppression layer 53 covering the front surface of the pointer-type instrument 2 are formed on the back surface of the protective plate 5 so that these layers are not laminated with each other.

This reduces the probability of inclusion of air bubbles between the display 3 and the protective plate 5 and the probability of separation of the display 3 from the protective plate 5.

Since the instruments included in the vehicle display device 1 are disposed adjacently to each other on a single surface of the protective plate 5 and the spaces between the instruments are concealed by the light blocking layers 52, the sense of unity among the instruments and the smoothness of the surface are achieved by the surface of the protective plate 5. In addition, the pointer-type instrument 2 provides three-dimensional effects at the back of the protective plate 5, so the vehicle display device 1 has an attractive external appearance and improved marketability.

In addition, in the vehicle display device 1 according to the invention, the color of the light blocking layer 52 of the protective plate 5 is adjusted to a low-contrast color similar to the color of the display surface of the display 3 when the display 3 is not illuminated and the color of the display surface of the alert instrument 4 when the alert instrument 4 is not illuminated. On the other hand, the metallic ring frame part 240 is provided in the outer periphery of the decorative member 24, which is the frame of the pointer-type instrument 2, so that the contrast between the light blocking layer 52 and the pointer-type instrument 2 is higher than the contrast between the light blocking layer 52 and the display 3 and the contrast between the light blocking layer 52 and the alert instrument 4.

This makes the pointer-type instrument 2 more prominent for the driver than the display 3 and the alert instrument 4, thereby making it easy for the driver to preferentially recognize important information during driving of the vehicle, such as the travel speed and engine revolutions of the vehicle indicated by the pointer-type instrument 2.

INDUSTRIAL APPLICABILITY

The invention is particularly suitable for a vehicle display device in which a pointer-type instrument and a display are provided adjacently to each other.

REFERENCE SIGNS LIST

1: vehicle display device
2: pointer-type instrument
2a: speedometer (pointer-type instrument)
2b: engine tachometer (pointer-type instrument)
21: pointer
22: dial plate
220: light guiding body
221: printed layer
23: light guiding body
24: decorative member
240: ring frame part
25: light source
26: light source
27: motor
28: circuit board
3: display
4: alert instrument
40: light source
5: protective plate
50: base material
51: first reflected-light suppression layer
52: light blocking layer
53: second reflected-light suppression layer
54: bonding layer
55: semitransparent layer
6: inner case
60: light blocking wall
61: light guiding wall
7: outer case

The invention claimed is:
1. A vehicle display device comprising:
a pointer-type instrument;
a display provided adjacently to the pointer-type instrument; and
a planar protective plate having a front surface on which a first reflected-light suppression layer is formed, the protective plate being provided so as to cover front surfaces of the pointer-type instrument and the display,
wherein the protective plate forms a light blocking layer for concealing a space between the pointer-type instrument and the display and
the protective plate includes, on a back surface, a light-transparency bonding layer covering and boding a display surface of the display and a second reflected-light suppression layer covering the front surface of the pointer-type instrument so that the light-transparency bonding layer and the second reflected-light suppression layer are not laminated with each other.

2. The vehicle display device according to claim 1, further comprising:
- an alert instrument provided adjacently to the pointer-type instrument and the display, the alert instrument having a front surface covered with the protective plate,
- wherein the light blocking layer conceals a space between the pointer-type instrument and the alert instrument and a space between the display and the alert instrument.

3. The vehicle display device according to claim 1, wherein a light blocking wall is disposed in a part on the back surface of the protective plate, the part being positioned between the pointer-type instrument and the display, the light blocking wall preventing emitted light from the pointer-type instrument and emitted light from the display from being mixed with each other on a rear surface of the protective plate.

4. The vehicle display device according to claim 1, wherein the pointer-type instrument indicates a travel speed of a vehicle and contrast between the light blocking layer and the pointer-type instrument is higher than contrast between the light blocking layer and instruments other than the pointer-type instrument.

\* \* \* \* \*